June 19, 1956 G. D. MILLS 2,750,808
MECHANICAL DEVICES
Filed Oct. 18, 1951

INVENTOR
GEORGE DUNCAN MILLS

BY
ATTORNEYS

United States Patent Office 2,750,808
Patented June 19, 1956

2,750,808

MECHANICAL DEVICES

George Dugan Mills, Gordon, New South Wales, Australia

Application October 18, 1951, Serial No. 251,882

6 Claims. (Cl. 74—471)

This invention relates to improved mechanical devices for applying, regulating and releasing pressures with appreciable mechanical advantage, whereby considerable pressures can be produced, maintained, regulated and released with proportionally low expenditure of power.

My invention may be applied to rock crushers, pressure moulding of bricks, plastics and the like, pumps to produce pressure. Regulation and release of fluids and the like.

In the accompanying drawings which illustrate some of the forms and applications of my invention, but are not to be held as limiting the invention to the illustrated forms, dispositions and uses of the invention:

Figure 1:
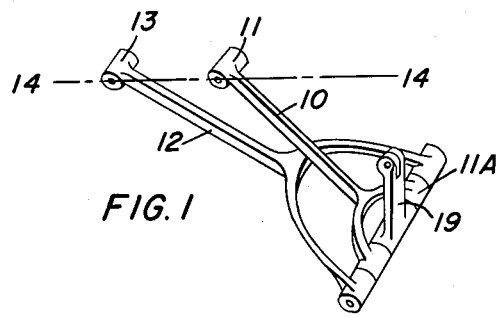
Fig. 1 is a perspective view of two interconnected links or levers of different lengths and projecting approximately in the same direction.

In Fig. 1 a relatively short link or lever 10 is formed or provided with part coupling members 11, 11A at its end; a longer link or lever 12 (shown broken in the drawing) is also provided with a part coupling for application to part coupling 11A of lever 10 and so that this combined coupling may be used and called the power-applied coupling. Lever or link 12 at its other or free end is formed or provided with a part coupling 13.

Part coupling 11 and part coupling 13 are on and are maintained on the same centre line 14 by guiding portions of the constructions associated with bodies to be operated by the levers 10 and 12.

The relative lengths of levers 10 and 12 may be adjusted by any convenient means such, for example, as a series of through holes in the lever arms and pins or bolts for said holes. The part couplings on these levers at their free ends are adapted to be connected with valves, presses, or other mechanisms or bodies. As part couplings 11A approach centre line 14 the connected bodies, valves or the like, approach each other and as the reverse movement of the couplings 11A takes place the bodies also move reversely, the extent of movement, due to the motion of part couplings 11A, being dependent on the relative lengths of the levers 10, 12, and is limited as desired by the use of adjustable stops to be contacted by the valves.

Figure 1A:
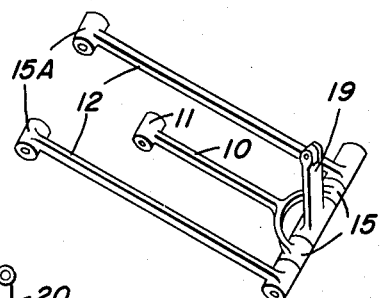
Fig. 1A is a similar view of two side links or levers of the same length interconnected with a shorter central lever and extending in approximately the same direction from the point of interconnection.

As shown in Fig. 1A, the shorter lever 10 is associated with two parallel longer levers 12 which are secured to lever 10 by coupling 15; the free ends of levers 12 are interconnected with each other by part couplings 15A (Fig. 2A) which are adapted to be connected with a movable body or valve 18. Coupling 11 is also connected with a movable body or valve 18A (Fig. 2A). The same centre line passes through body or valve 18 and body or valve 18A.

Figure 2:
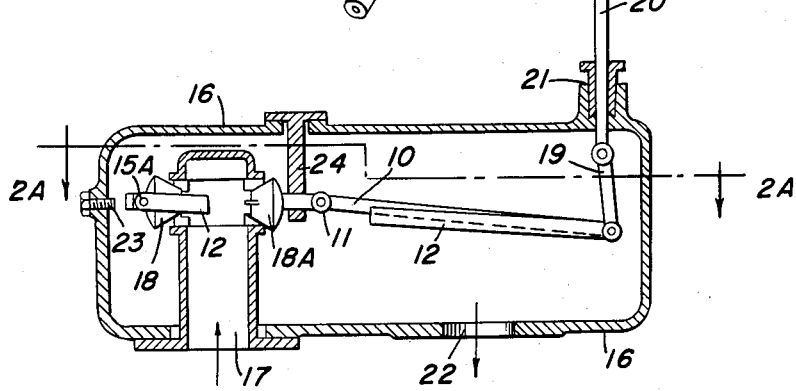
Fig. 2 is a part-sectional side elevation of one form of the invention applied to the operation of two valves.
Figure 2A:
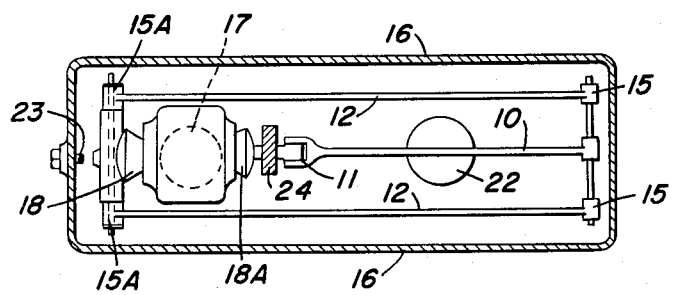
Fig. 2A is a partly-sectioned plan on line 2A—2A of Fig. 2.

In Fig. 2 a casing 16 is fitted with an inlet 17 for fluid and internally is fitted with two closure valves 18, 18A. Valve 18 is connected with levers 12 by way of coupling 15A, and valve 18A is similarly connected with lever 10. Coupling 15 is attached to a link 19 which in turn, may be connected to a diaphragm for governing fluid pressures, or other power operable through rod 20 passing through a stuffing box 21. Casing 16 is provided with an outlet 22.

An adjustable stop 23 regulates the extent of opening of valve 18 and a guide stop 24 regulates similar movement of valve 18A.

In Figs. 2 and 2A the valves 18, 18A are shown arranged so that they are adapted to move further apart or in opposite directions to open; and to close they move towards each other. This action of the valves is identical with the movements of the couplings 11, 15A of Fig. 1A.

Figure 3:
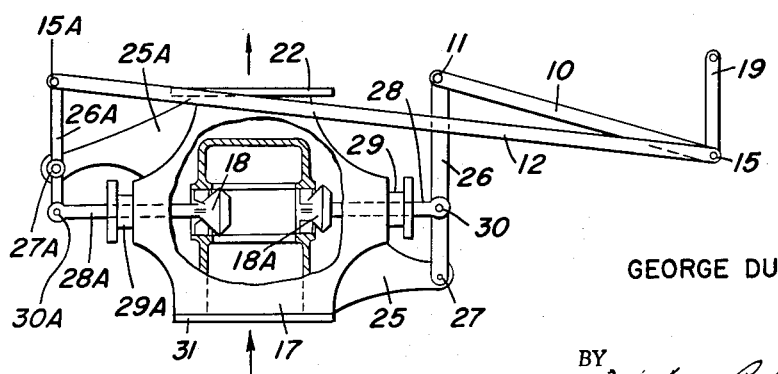
Fig. 3 is a partly sectioned side elevation showing the application of the levers of Fig. 1A to the operation of valves.

In Fig. 2 the valves 18, 18A are shown to open in opposite directions and also to close in opposite directions to each other; but in Fig. 3 the valves 18, 18A are adapted to open in the same direction and to close in the same direction as each other. To enable central lever 10 and outer levers 12 of Fig. 3 to give the required motion to these valves, in the form of construction used by me two levers 26, 26A are interposed; lever 10 is coupled to one end of lever 26 at 11, and the other end of lever 26 is coupled with a bearing pin 27 on a bracket 25 and also coupled to valve stem 28 which passes through a stuffing box 29; and is suitably connected with lever 26 at 30.

Levers 12 are coupled to one end of lever 26A at 15A, and the other end of lever 26A is suitably connected at 30A with valve stem 28A which passes through a stuffing box 69A; lever 26A is coupled to a bearing 27A on bracket 25A. Although I prefer this form of additional lever action, any other similar lever arrangement for the same purpose may be used without altering the invention.

When link 19 is raised the valve 18A is closed through the movement of levers 10 and 26, and valve 18 is simultaneously closed by movement of levers 12 and 26A; the valves are opened by reverse movement of the link 19.

It will be apparent that the valves illustrated in Figs. 2 and 3 constitute what is known as a balanced valve.

The combination of my levers as shown in the drawings is different in construction, formation, operation and movement from a toggle as shown by the following:

Power to work a toggle is applied at its mid point. In my construction power is applied at the end part coupling 11A or 15. A toggle relies on the amount of travel of the center, mid point or knee joint to give the motion to one end of the toggle lever. In my combination the movements of the ends 11, 13 (Fig. 1) and 11, 15A (Fig. 1A) are not only governed by the amount of travel of part couplings 11A and 15, but mainly by difference in length between levers 10 and 12, namely both the outer and the central levers in their common movement at part couplings 11A, 15 giving a differential movement between the ends 11 and 13 (Fig. 1) and between 11, and 15A (Fig. 1A).

A toggle has two levers of equal length with the knee joint at mid point. My combination has levers of different length.

One toggle arm on its outer end is fitted with a fixed bearing. My levers at their ends are or may be connected with valves or other movable mechanism or bodies and not as a toggle with one fixed bearing. This connection of my levers between valves or the like at both free ends of the levers giving an opposite and equal pressure re-action between the valves or bodies, thus giving the effect as a fixed balanced valve; although in normal cases of so-called balanced valves there is a fixed connection between the valve bodies, whereas in my construction there is no fixed connection between the valve bodies other than that given by my lever system; a common casing for the valves being normal in each case. My construction also has the added advantages of closing each valve independently and ensuring that both valves close effectively.

The movement of the knee joint of a toggle increases or decreases the distance between remote ends of the toggle levers. In my construction power to operate is applied at one common end—coupling 11A or 15—: the resultant pressure and movement which may be applied to valves or the like movable bodies are given at the lever ends 11, 13 (Fig. 1) and 11, 15A (Fig. 1A) which lever ends are in close proximity to each other and are adapted to operate oppositely opposed or balanced valves or other oppositely opposed forces or bodies.

Instead of a fixed pivot bearing for one lever taking the thrust or pressure as in a toggle, in my combination the levers are linked with a movable valve or the like which balances the opposite valve or the like pressure and produces equilibrium and consequently reduces the amount of power required for operation.

A toggle cannot take the place of or be the mechanical equivalent of my combination.

In known balanced valves great difficulty is experienced in getting two integral seats and a valve to seat accurately without continuous grinding and setting. In my construction such accurate fitting is not required.

What I claim as my invention and desire to secure by Letters Patent is:

1. A device for applying substantially equal forces to two movable bodies, comprising a relatively long link and a relatively short link connected together by a common coupling at one end of each and extending in the same general direction, a movable body operatively connected to the extended end of each link, means guiding the movements of said bodies along a common axis, and means for moving the common coupled ends of said links toward and away from said axis, whereby one of said extended link ends is placed under compression while the other said link end is placed under tension to thereby move said bodies equal amounts measure on said axis.

2. A device according to claim 1, including means guiding said common coupled link ends in their movements toward and away from said axis, to control the direction of the resulting movements of said bodies along said axis.

3. A device according to claim 1, said last means comprising a further link connected to the coupled ends of said other links and extending substantially at 90° to said axis.

4. A device according to claim 1, said relatively long link comprising two parallel elements, one on either side of said relatively short link.

5. A device according to claim 1, said operative connections between said links and said bodies comprising levers fulcrummed at fixed points.

6. A device according to claim 5, said levers being fulcrummed one medially and one distally.

References Cited in the file of this patent

UNITED STATES PATENTS

| | | |
|---|---|---|
| 559,192 | McNerney | Apr. 28, 1896 |
| 621,193 | Wilson | Mar. 14, 1899 |
| 1,024,941 | Lambert | Apr. 30, 1912 |
| 1,522,421 | Crossen | Jan. 6, 1925 |
| 1,555,921 | Harris | Oct. 6, 1925 |
| 1,916,278 | Mitchell | July 4, 1933 |
| 2,454,981 | Vint, Jr. | Nov. 30, 1948 |
| 2,485,192 | Eecksteadt | Oct. 18, 1949 |
| 2,595,650 | Eppler | May 6, 1952 |
| 2,597,379 | Romel | May 20, 1952 |